United States Patent [19]

Feimer et al.

[11] Patent Number: 5,256,297
[45] Date of Patent: Oct. 26, 1993

[54] MULTI-STAGE ULTRAFILTRATION PROCESS (OP-3711)

[75] Inventors: Joseph L. Feimer; Leo T. DesJardine, both of Sarnia, Canada

[73] Assignee: Exxon Research and Engineering Company, Florham Park, N.J.

[21] Appl. No.: 992,052

[22] Filed: Dec. 17, 1992

[51] Int. Cl.$^5$ .............................................. E01D 61/14
[52] U.S. Cl. ................................. 210/651; 210/195.2
[58] Field of Search ........ 210/634, 641, 644, 649–654, 210/195.2

[56] References Cited

U.S. PATENT DOCUMENTS

| | | | |
|---|---|---|---|
| 4,411,790 | 10/1983 | Arod et al. | 210/637 |
| 4,750,990 | 6/1988 | Kulkarni et al. | 208/251 |
| 4,797,200 | 1/1989 | Osterhuber | 208/308 |
| 4,814,088 | 3/1989 | Kutowy et al. | 210/651 |
| 4,816,140 | 3/1989 | Trambouze et al. | 208/309 |

Primary Examiner—Frank Sever
Attorney, Agent, or Firm—Joseph J. Allocca

[57] ABSTRACT

This invention relates to a method for ultrafiltering heavy hydrocarbons containing detrimental qualities of metals and CCR, said method comprising feeding the heavy hydrocarbons to a first ultrafiltration stage wherein the feed is contacted with an ultrafiltration membrane thereby producing a first permeate and a first retentate and feeding the first permeate to a second ultrafiltration stage wherein the first permeate is contacted with an ultrafiltration membrane which is the same as the ultrafiltration membrane in the first ultrafiltration stage to recover a second permeate of significantly reduced metals and CCR content and a second retentate. The second permeate can be sent to subsequent ultrafiltration stages utilizing the same membrane with permeate from each such stage being used as feed to the next subsequent downstream stage. Retentate from the different stages can be recycled to the feed of the previous upstage ultrafiltration stage or can be combined with the retentate streams from the various ultrafiltration stages.

5 Claims, No Drawings

MULTI-STAGE ULTRAFILTRATION PROCESS
(OP-3711)

BACKGROUND OF THE INVENTION

1. Field of the Invention

The present invention relates to a process for treating heavy hydrocarbons by ultrafiltration. Heavy hydrocarbon feed containing detrimental quantities of metals and/or Conradson Carbon Residue (CCR) and/or asphaltenes is fed to a first ultrafiltration stage wherein it is contacted with a first ultrafiltration membrane to produce a first permeate and a first retentate. The first permeate is sent as feed to a second ultrafiltration stage wherein it is contacted with a second ultrafiltration membrane which is identical to the first ultrafiltration membrane, thereby producing a second permeate and a second retentate. The second permeate unexpectedly has a lower level of metals and CCR than does the first permeate. The second permeate, if of low enough metals and/or CCR and/or asphaltenes content can be used as cat cracker feed, or it can be sent as feed to a third ultrafiltration stage for contacting with a third ultrafiltration membrane, again identical to the first ultrafiltration membrane. The retentates from each zone can be combined, or the retentate from downstream stages can be recycled to the previous upstream stage for combination and coprocessing with the feed to that previous stage.

Stated differently, the process involves multiple ultrafiltration stages, each stage using the same membrane material, wherein the permeate from the previous upstage stage is used as feed to the next lower downstream stage, any number of such stages being used in series until permeate of the desired quality is obtained.

2. Description of the Related Art

The treatment of heavy hydrocarbon feed by ultrafiltration is known in the art.

U.S. Pat. No. 4,411,790 teaches the ultrafiltration of hydrocarbon feeds by circulating the feed through at least one module having an inorganic barrier coated with a metal oxide layer. The process can be used to regenerate used lube oils or for reducing the asphaltene content of heavy oils (e.g., vacuum residue). The barrier is preferably a porous metal or ceramic support with a pore radius of 50 to 250 Å. The metal oxide layer can comprise $TiO_2$, $MgO$, $Al_2O_3$, $SiO_2$ or an $Al_2O_3$ based mixed oxide (e.g., $Al_2O_3$-$MgO$; $Al_2O_3$-$SiO_2$).

Multiple elements can be used in series with the permeate from one element being used as the feed to a subsequent downstream unit. The different modules may contain barriers having different pore radii e.g., the first barrier of radii 200 Å, the following of 150 Å and so on.

U.S. Pat. No. 4,814,088 is directed to a process for removing high molecular weight components and inorganic compounds from oil feeds by passing the feed across the high pressure side of a microporous membrane so that oil depleted in the high molecular weight and inorganic component permeates through the membrane leaving a retentate rich in high molecular weight components and inorganic compounds. Preferred membranes are polysulfones, polyacrylonitriles, polyamides and polyvinylidine fluorides. Molecular cut off is preferably less than about 10,000 in aqueous medium and less than 4000 in oil.

U.S. Pat. No. 4,816,140 is directed to a process for deasphalting a hydrocarbon oil using a hydrocarbon solvent containing 3 to 8 carbons. The solvent is recovered from the deasphalted oil by passing the solvent/oil solution across an inorganic membrane of pore radii from 2 to 15 nonometers to recover solvent as permeate and oil as retentate.

U.S. Pat. No. 4,750,990 is directed to a process for the membrane separation of hydrocarbons using cycloparaffinic solvents. A heavy crude oil containing metals may be separated from light hydrocarbon oil by passing a solution of the crude oil dissolved in a $C_5$ to $C_8$ cycloparaffin through a polymeric membrane. The light oil will be recovered as permeate and a heavy oil containing the metal contaminants will be recovered as retentate. The membrane possesses pore sizes in the range of from about 5 to about 500 Å with a solubility parameter $\delta$, such that the absolute value $(\delta-10)$ $[cals/cm^3]^{\frac{1}{2}}$ is greater than 1 and which is different from the solubility parameter of the solvent and recovered light oil.

U.S. Pat. No. 4,797,200 is directed to upgrading heavy oils by solvent dissolution and ultrafiltration. The process removes metals such as nickel and vanadium from the oil as well as lowering the Conradson Carbon Residue of the resulting oil. In the process, the oil feed is diluted with a solvent which completely solvates the oil and the resulting solution is subjected to ultrafiltration using membranes. A permeate enriched in aromatic and saturated hydrocarbons is recovered.

SUMMARY OF THE INVENTION

The present invention is directed to a process for upgrading heavy hydrocarbon feeds containing detrimental amounts of metals and/or asphaltenes and/or having high Conradson Carbon Residue levels by ultrafiltering the heavy hydrocarbon feed through at least two membrane separation stages operating in series wherein the permeate from each separation stage in series is used as the feed to the next subsequent downstream separation stage and wherein each separation stage uses the same ultrafiltration membrane.

It has been discovered that the permeate recovered from the second separation stage utilizing the same ultrafiltration membrane as the first separation stage has a lower metals content, lower CCR content and lower asphaltenes than would be expected when using two separation stages in series both of which employ the same membrane.

In so far as ultrafiltration is a separation process which relies on size differences one would not expect any improvement in terms of enhanced metal CCR or asphaltene reduction performance in the second stage when using the same membrane for both stages. It would have been expected that the asphaltenes CCR and metals that passed through the porous membrane in the first stage and, therefore, were entrained in the permeate from the first stage would also pass through the ultrafiltration membrane of the second stage when the first stage permeate was fed to the second stage and when the second stage used the same ultrafiltration membrane as the first stage. One would have expected the second stage permeate to have the same metals CCR and asphaltenes content as the first stage permeate.

In practicing the present multi-stage process it is anticipated that in most instances only two stages will be required to achieve the desired level of metals, CCR and asphaltenes reduction. If necessary, however, three or more stages, each using the same membrane as the preceding stage can be used in series to achieve the desired level of removal.

The feed and the process is typically a heavy hydrocarbon oil feed. Such oils include atmospheric and vacuum resid, heavy fuel oils, used oil, heavy and light crudes etc. Resids typically contain nickel, vanadium, sodium, sulfur, nitrogen and basic nitrogen containing compounds and have an appreciable level of CCR.

The ultrafiltration membrane used can be any polymeric, ceramic, sintered metal, sintered glass, etc., membrane. Polymeric membrane includes both organic and inorganic polymeric membranes such as polyimide, polysulfone, polyaryl sulfone, polycarbonate, polyamide and polyacrylonitrile membrane and membranes such as carbon membranes. Ceramic membranes can be any of the typical ceramic ultrafiltration membranes such as those made of cordierite, alumina, silica-alumina, alumina containing materials such as $Al_2O_3$-$TiO_2$, $Al_2O_3$-MgO, etc., and mixtures thereof.

Likewise, ceramic membrane include those comprising large pore ceramic bases upon which is deposited an organic or inorganic selective layer, such as polyimide or polysulfone or a thin layer of alumina or silica deposited on a ceramic base. This technique of depositing a thin polymeric or inorganic oxide layer on a larger pore ceramic base is useful for producing a ceramic membrane of a particular pore size.

The ultrafiltration membrane will typically have a pore size in the range of 5 to 1000 Å, preferably 10 to 100 Å, most preferably 20 to 60 Å.

The ultrafiltration separation process is conducted at a temperature in the range 100° to 500° C., preferably 200° to 400° C., most preferably 300° to 400° C. and at an applied pressure in the range 20 to 500 psig, preferably 50 to 300, psig, most preferably 50 to 200 psig.

In practicing the separation, the hydrocarbon feed can be introduced to the ultrafiltration membrane without any added solvent or diluent. This is practical if the hydrocarbon feed is of low enough viscosity or can be heated to a sufficiently high temperature to make it amenable to ultrafiltration.

If the feed viscosity is too high or if heating is not an available option, (such as if a polymeric membrane is used or if heat would degrade the feed) a diluent can be used to reduce the viscosity.

Typical diluents include hydrocarbon streams lighter than the original feed to the ultrafiltration unit. Thus, kerosene, reformate, gasoline, etc., can be used as diluent. The diluent should be one which is either of such a physical character that it can be left in the recovered permeate or if it is not compatible with the final uses of the permeate, can be easily recovered from the permeate oil and recycled. Ideally the diluent will be such as to be compatible with the final use to which the recovered permeate is to be put and can be left in the recovered permeate thus avoiding an additional separation/recovery step.

In the process of the present invention the permeate from upstream ultrafiltration separation stages is used as feed to the next lower, downstream separation stages, each such stage using the same ultrafiltration membrane. The retentate from each such separation stage can be individually collected and then combined. Alternatively, the retentate from a downstream stage, e.g., a second separation stage, can be recycled and combined with the feed which is fed to the previous upstream stage, e.g., the first separation stage, and thereby be coprocessed with the fresh feed. In this way any valuable light oil component present in the downstream stage retentate can be recaptured in the permeate of the higher upstream stage.

By treating the heavy hydrocarbon feed contaminated with detrimental amounts of metals (e.g., nickel and/or vanadium) and/or high CCR levels and/or asphaltenes in the multi-stage ultrafiltration process of the present invention a permeate is secured which is useable as cat feed.

The rejection of metals and CCR is vital to obtaining usable cat feed. Typically, cat feed contains less than 1 wppm V+Ni and less than 1 wt % CCR. To minimize the effect on the cat cracker operation the permeate quality from ultrafiltration should ideally meet normal cat feed metal and CCR levels. However, permeate containing more metals and CCR can be tolerated in the cat cracker but at an economic debit. The cat cracker requires a higher catalyst make-up rate with high metal feeds and must burn more coke with higher CCR feeds. For an economic ultrafiltration process the above debits must be less than the credits associated with processing a low cost heavy hydrocarbon feed.

By practicing multi-stage ultrafiltration wherein each ultrafiltration stage employs the same membrane, one can significantly improve the metals removal and CCR reduction while still using ultrafiltration membranes which exhibit high enough flux to be commercially viable.

Previously, to achieve the desired level of metals removal and CCR reduction in a single pass it was necessary to employ ultrafiltration membranes of low flux, such low flux being associated with the small membrane pore sizes needed to achieve the desired level of metal and CCR reduction.

By comparison and unexpectedly, it has been found that membranes which exhibit high flux, and, as a consequence lower rejection (due to larger pore sizes) can be used to achieve the desired level of metals and CCR reduction when the same membrane is used in a series of stages. By using the same membrane in each stage there is no loss in overall flux, and, in fact, flux goes up as compared to a single ultrafiltration stage.

EXAMPLE

A polyimide ultrafiltration membrane was used in each of two ultrafiltration stages.

The polyimide membrane was made by the process recited in U.S. Pat. No. 4,963,303. It is estimated that this membrane has pores ranging in size of from 10 to 100 Å.

Ultrafiltration was performed at 150° C. and 30 psig using as feed a 20/80 mixture of naphtha (as diluent) and resid. The results are presented in Table 1.

TABLE 1

| Single and Two-Stage Ultrafiltration Performance | | | |
|---|---|---|---|
|  | FEED | Permeate SINGLE-STAGE | Permeate TWO-STAGE |
| Ni + V, wppm | 90 | 36 | 18 |
| Metals Rejection, % |  | 60 | 80 |
| Flux, kg/m2-d |  | 30 | 40 |

As shown, the two-stage process reduces the metals to half of that obtained in the single stage (18 versus 36 wppm). Furthermore, the flux of the second stage is higher than in the single stage (40 versus 30 kg/m²-d).

This significant improvement in the metals rejection is unexpected. One would have expected that the asphaltenes and metals that passed through the porous membrane in the first stage would also pass through in the second stage.

Since ultrafiltration is a low pressure application the additional cost of a two stage process is not substantial. An extra low pressure pump and feed tank is all that is required. The benefits due to the improvement in rejection far outweigh the cost of this additional equipment.

What is claimed is:

1. A process comprising treating heavy hydrocarbon feeds containing detrimental quantities of metals, Conradson Carbon Residue (CCR) and asphaltenes, by ultrafiltering the heavy hydrocarbon feed through multiple ultrafiltration stages operating in series under ultrafiltration conditions wherein the permeate from each upstream separation stage in series is used as the feed to the next subsequent downstream separation stage so as to produce a subsequent permeate and a subsequent retentate, said subsequent permeate having a level of metals and Canradson Carbon Residue which is lower that the level of said components in the permeate used as feed to that stage an wherein each separation stage uses identical ultrafiltration membrane material.

2. The method of claim 1 for processing heavy hydrocarbon feeds having detrimental quantities of metals and Conradson Carbon Residue, said method comprising feeding the heavy hydrocarbon feed to a first ultrafiltration stage wherein said feed is contacted with a first ultrafiltration membrane to produce a first permeate and a first retentate and sending the first permeate as feed to a second ultrafiltration stage wherein it is contacted with a second ultrafiltration stage which is identical to the first ultrafiltration membrane, so as to produce a subsequent permeate used as feed to that stage and a subsequent retentate, said second permeate having a level of metals and Conradson Carbon Residue which is lower than the level of said components in the first permeate.

3. The method of claim 1 wherein the retentates from each downstream stage is recycled to the previous upstream stage for combination and coprocessing with the feed to that upstream stage.

4. The process of claim I wherein the ultrafiltration membrane has a pore size in the range of 5 to 1000 Å and the ultrafiltering is conducted at a temperature in the range 100° to 500° C. and at an applied pressure in the range 20 to 500 psig.

5. The process of claim 1 wherein the heavy hydrocarbon feed is mixed with a diluent.

* * * * *